Oct. 30, 1962   J. W. JONES   3,061,291
PAVEMENT CUTTER

Filed Aug. 9, 1960   2 Sheets-Sheet 1

JOHN W. JONES
INVENTOR.

BY *C. W. Coffee*
Atty.

Oct. 30, 1962 J. W. JONES 3,061,291
PAVEMENT CUTTER
Filed Aug. 9, 1960 2 Sheets-Sheet 2

JOHN W. JONES
INVENTOR.

BY

# United States Patent Office 3,061,291
Patented Oct. 30, 1962

3,061,291
PAVEMENT CUTTER
John Wayne Jones, % Jones Bros. Dirt Contractors,
P.O. Box 3983, Odessa, Tex.
Filed Aug. 9, 1960, Ser. No. 48,467
1 Claim. (Cl. 262—20)

This invention pertains to asphalt cutters of the type using a beveled disc cutter.

Often it is desirable to remove a narrow strip of asphalt paving, e.g. to bury conduits or lines or cables under the pavement.

An object of this invention is to provide a cutter for cutting the pavement so that the strip between two successive passes may be removed easily.

Other objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which.

Figure 1:
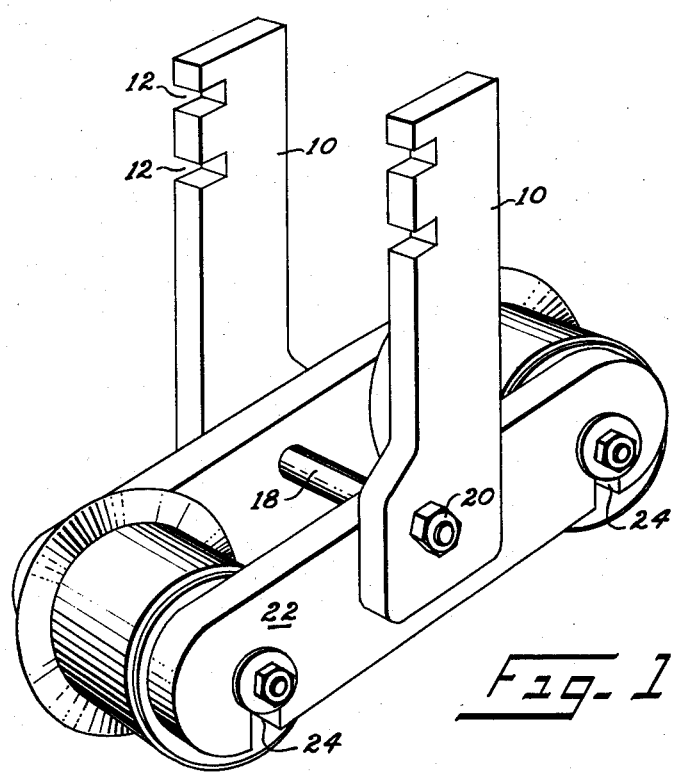
FIG. 1 is a perspective view of an embodiment of this invention.
Figure 2:
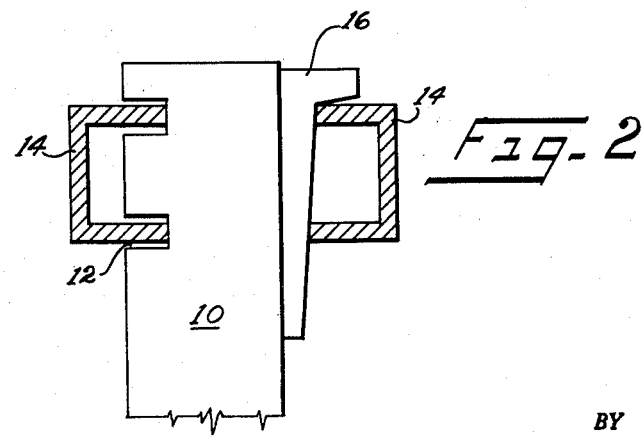
FIG. 2 is a sectional view showing the manner in which a shank would be attached to road working equipment.
Figure 3:
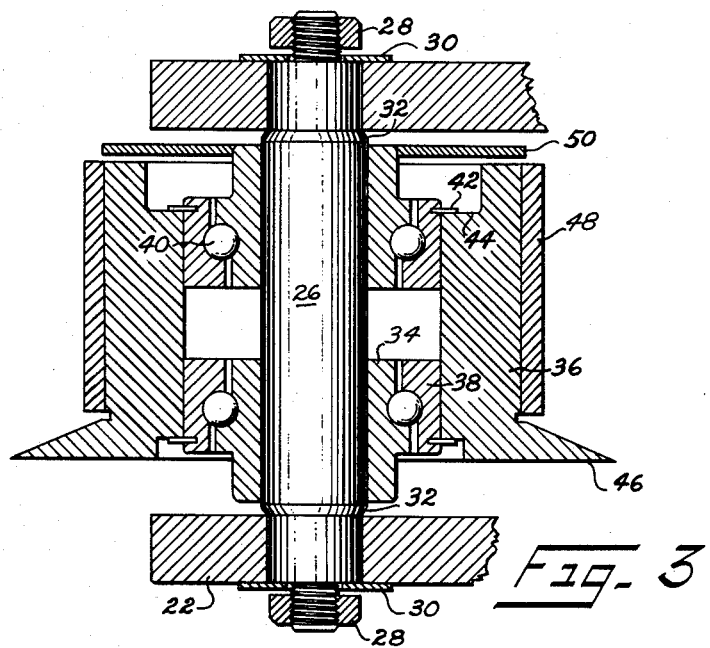
FIG. 3 is an axial sectional view of one of the cutters.
Figure 4:
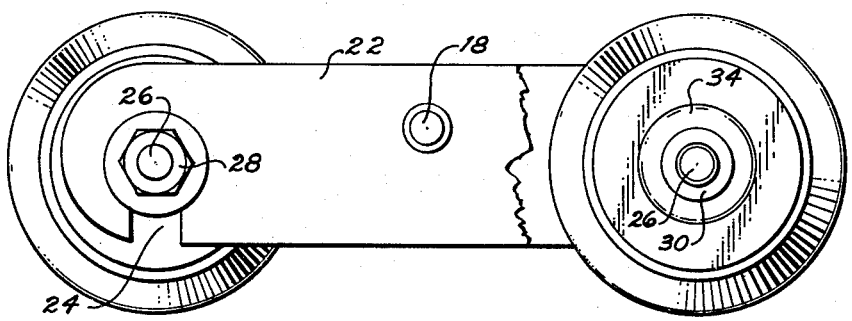
FIG. 4 is an end view, partially broken away, of the truck plates and cutters.

As may be seen in the drawings, this is an attachment which is meant to be attached to a standard piece of road working equipment.

Included in the attachment is a bracket including two shanks 10. The shanks are parallel pieces of plates having two notches 12 in the upper portion thereof. The notches are so spaced to register with flanges upon a carrier bar 14. Then the notches 12 are mated with the flanges and a wedge 16 is driven behind the shanks, the attachment is securely attached to the carrier bar.

At the lower end of each shank is a hole through which extends spindle 18. This spindle is secured from endwise motion by nut 20. Two truck plates 22 are mounted to the bracket by the spindle, 18. The truck plates each have a hole therethrough so that when mounted they are in parallel relationship to each other and to the bracket shanks. Each plate has two notches 24 in the lower side thereof. The plates are identical to each other.

Axle 26 spans the plates being fitted into the front notch of each plate. Likewise, an identical axle 26 spans the plates, each end being fitted into the back notch. The axle is secured against endwise movement by a nut 28 located on either end. The nut bears against washer 30 which bears against a shoulder of the axle. The axle has a cylindrical portion between the washer and shoulder 32, the shoulder 32 being of greater diameter and extending from one plate to the other. The plate 22 is held between the shoulder 32 and the washer 30. Two bearing inner-races 34 are mounted on either end of the axle. The inner-races 34 are limited from outward motion by contact with the plates 22. They are limited from inward motion by cutter 36 as will be explained later.

Outer-races 38 are maintained in the working relationship by the ball bearings 40. The retaining ring 42 which fits within a groove of the outer-race fits against the outer edge of shoulder 44 of the cutter 36. The cutter is cylindrical and extends from the outer-race of one bearing to that of the other. Flange or single beveled cutter proper 46 extends outward from one end. By single beveled it is meant that the outer edge of the cutter itself is a plain surface whereas the inner face which projects from the cylindrical portion is conical. The periphery of the flange is a cutting edge. Wear shoe 48 is a tubular guide roller or tire which fits around the cylindrical portion of the cutter. The guide roller or wear shoe will ride on the pavement to be cut, thus, the depth of the cut will be the radial distance the blade proper 46 projects by the wear shoe. The wear shoe is prevented from moving axially on the cutter by butting against the bevel of the cutter on one edge and against washer 50 on the other.

A great quantity of weight may be exerted downward by the carrier bar 14 through the bracket to the cutters themselves. Yet if the paving is irregular there is a certain accommodation to this by the tandem arrangements of the cutter.

It will be apparent that the embodiment shown is only exemplary and that various modifications can be made in construction, materials, and arrangement within the scope of the invention as defined in the appended claim.

I claim as my invention:

An asphalt cutter comprising: a bracket adapted to be mounted upon a piece of road-working equipment, said bracket including two plates spaced apart, a spindle extending between the two plates, two truck plates rotatably mounted by said spindles, said truck plates being in parallel arrangement to said bracket plates, said truck plates being of identical form, said truck plates having two notches located in the under side thereof, an axle extending from the forward notch of one plate to the forward notch of the other plate, a cutter and guide roller assembly mounted on said axle, an axle extending from the rear notch of one plate to the rear notch of the other plate, with a cutter and roller assembly mounted thereon in tandem relation to the assembly mounted on the front axle, each of said cutter and roller assemblies including a bearing mounted upon said axle, a cylinder mounted upon the bearing, the cylinder having an integral flange at one end, the flange beveled on the inside so that the periphery is a cutting edge, and a tubular tire contacting the cylinder and extending from the flange to the opposite end of said cylinder.

References Cited in the file of this patent

UNITED STATES PATENTS

| | | |
|---|---|---|
| 892,027 | Cahoon | June 30, 1908 |
| 1,331,367 | Petermann | Feb. 17, 1920 |
| 2,675,645 | Deppe | Apr. 20, 1954 |
| 2,935,308 | Zorn | May 3, 1960 |